US012609324B2

(12) United States Patent
Li et al.

(10) Patent No.: US 12,609,324 B2
(45) Date of Patent: Apr. 21, 2026

(54) LITHIUM-ION BATTERY AND FORMATION METHOD THEREOF

(71) Applicant: CALB Co., Ltd., Jiangsu (CN)

(72) Inventors: Xu Li, Changzhou (CN); Chen Cao, Changzhou (CN); Song Hua, Changzhou (CN); Guangkuo Gao, Changzhou (CN); Dongdong Zheng, Changzhou (CN)

(73) Assignee: CALB Co. Ltd., Jiangsu (CN)

( * ) Notice: Subject to any disclaimer, the term of this patent is extended or adjusted under 35 U.S.C. 154(b) by 582 days.

(21) Appl. No.: 18/164,611

(22) Filed: Feb. 5, 2023

(65) Prior Publication Data

US 2024/0170679 A1     May 23, 2024

(30) Foreign Application Priority Data

Nov. 21, 2022    (CN) .......................... 202211453292.5

(51) Int. Cl.

| | |
|---|---|
| *H01M 4/66* | (2006.01) |
| *H01M 10/0525* | (2010.01) |
| *H01M 10/0562* | (2010.01) |
| *H01M 10/0585* | (2010.01) |

(52) U.S. Cl.
CPC ....... *H01M 4/667* (2013.01); *H01M 10/0525* (2013.01); *H01M 10/0562* (2013.01); *H01M 10/0585* (2013.01); *H01M 2300/0077* (2013.01)

(58) Field of Classification Search
CPC ...... H01M 4/667; H01M 4/044; H01M 4/133; H01M 4/366; H01M 4/13; H01M 10/0525; H01M 10/0562; H01M 10/056; H01M 2300/0017; H01M 2300/0088; H01M 2300/0077; H01M 2004/027
See application file for complete search history.

(56) References Cited

U.S. PATENT DOCUMENTS

| | | | | |
|---|---|---|---|---|
| 2010/0297510 A1* | 11/2010 | Kim | ...................... | H01M 4/366 |
| | | | | 429/221 |
| 2018/0277843 A1* | 9/2018 | Yasuda | ................. | H01M 4/385 |
| 2021/0111425 A1 | 4/2021 | Kim et al. | | |
| 2021/0336270 A1 | 10/2021 | Ogata et al. | | |
| 2021/0367224 A1* | 11/2021 | Gaben | ................. | H01M 4/0423 |

FOREIGN PATENT DOCUMENTS

| | | |
|---|---|---|
| CN | 2014229579 | 12/2014 |
| CN | 111525204 | 8/2020 |
| CN | 110112421 | 5/2022 |
| CN | 115241427 | 10/2022 |

OTHER PUBLICATIONS

Zhonghui Gao et al., "Promises, Challenges, and Recent Progress of Inorganic Solid-State Electrolytes for All-Solid-State Lithium Batteries", Advanced Materials, Feb. 22, 2018, pp. 1-27, vol. 30, Issue 17.
"Search Report of Europe Counterpart Application", issued on Sep. 5, 2023, p. 1-p. 7.
"Office Action of China Counterpart Application", issued on Jan. 13, 2023, with English translation thereof, p. 1-p. 15.

* cited by examiner

*Primary Examiner* — Aiqun Li
(74) *Attorney, Agent, or Firm* — JCIP GLOBAL INC.

(57) ABSTRACT

A lithium-ion battery and a method of preparing the same are provided. The lithium-ion battery includes a cell and an electrolyte solution, and the cell includes a negative electrode sheet. The negative electrode sheet includes a negative electrode current collector, an active coating layer disposed on a surface of the current collector, and a protective coating layer disposed on a surface of the active coating layer. The protective coating layer is a solid-state electrolyte coating layer. The electrolyte solution contains a film-forming agent. The method includes the following steps. After the cell is placed in a casing and the electrolyte solution is injected, formation is performed on the lithium-ion battery. The formation includes: S1, performing charging to 3.4V to 3.75V with a constant current rate of 0.02C to 0.04C; and S2, performing charging to 3.75V to 4.25V with a constant current rate of 0.05C to 0.3C.

7 Claims, No Drawings

LITHIUM-ION BATTERY AND FORMATION METHOD THEREOF

CROSS-REFERENCE TO RELATED APPLICATION

This application claims the priority of China patent application serial no. 202211453292.5, filed on Nov. 21, 2022. The entirety of the above-mentioned patent application is hereby incorporated by reference herein and made a part of this specification.

BACKGROUND

Technical Field

The disclosure belongs to the field of chemical power supply, and in particular, relates to a lithium-ion battery and a formation method thereof.

Description of Related Art

At present although high-nickel silicon-oxygen system batteries have higher mass energy density, the safety issues caused by thermal runaway of batteries are particularly important. The source of safety issues caused by thermal runaway is mainly reflected in the heat release at the positive/negative electrode interface and the crosstalk reaction between the positive and negative electrodes.

SUMMARY

The disclosure provides a lithium-ion battery and a formation method thereof.

The disclosure provides a lithium-ion battery including a negative electrode sheet. The negative electrode sheet includes a negative electrode current collector, an active coating layer disposed on a surface of the current collector, and a protective coating layer disposed on a surface of the active coating layer. The protective coating layer is a solid-state electrolyte coating layer. A molar ratio of a content of high-valence metal elements to a content of low-valence metal elements in the same type of elements in the protective coating layer is 1:0.1 to 1:1.

The disclosure further provides a method of preparing a lithium-ion battery. The lithium-ion battery includes a cell and an electrolyte solution. The cell includes a negative electrode sheet. The negative electrode sheet includes a negative electrode current collector, an active coating layer disposed on a surface of the negative electrode current collector, and a protective coating layer disposed on a surface of the active coating layer. The protective coating layer is a solid-state electrolyte coating layer. The electrolyte solution contains a film-forming agent. The method includes the following step. After the cell is placed in a casing and the electrolyte solution is injected, formation is performed on the lithium-ion battery. The formation includes the following steps. In S1, charging is performed to 3.4V to 3.75V with a constant current rate of 0.02 C to 0.04 C. In S2, charging is performed to 3.75V to 4.25V with a constant current rate of 0.05 C to 0.3 C.

The disclosure further provides a lithium-ion battery prepared by the abovementioned method.

DESCRIPTION OF THE EMBODIMENTS

The disclosure is further described in detail in combination with specific embodiments.

The disclosure provides a lithium-ion battery including a negative electrode sheet. The negative electrode sheet includes a negative electrode current collector, an active coating layer disposed on a surface of the negative electrode current collector, and a protective coating layer disposed on a surface of the active coating layer. The protective coating layer is a solid-state electrolyte coating layer. A molar ratio of a content of high-valence metal elements to a content of low-valence metal elements in the same type of elements in the protective coating layer is 1:0.1 to 1:1.

In an optional embodiment, the molar ratio of the content of high-valence metal elements to the content of low-valence metal elements is 1:0.3 to 1:0.7.

In an optional embodiment, a thickness of the solid-state electrolyte coating layer is 0.5 μm to 5 μm.

In an optional embodiment, the active coating layer includes an active material selected from one or more of graphite, silicon carbon, silicon oxide, and ferro-silicon alloy.

In an optional embodiment, the solid-state electrolyte of the solid-state electrolyte coating layer is selected from ion conductors containing $Ti^{4+}$, such as one or more of a NASICON-type solid-state electrolyte $Li_{1+x}Al_xTi_{2-x}(PO_4)_3$ (LATP) ($0<x<2$), a perovskite-type solid-state electrolyte $Li_{3x}La_{2/3-x}TiO_3$(LLTO) ($0<x<2/3$), and a garnet-structured $Li_{7-3x}Ga_xLa_3Zr_2O_{12}$ (LLZO) ($0<x<1$) and $Li_{6.4}La_3Zr_{1.4}Ta_{0.6}O_{12}$ (LLZO) and the like.

In an optional embodiment, a positive electrode active material of the lithium-ion battery is $LiNi_xCo_yMn_{1-x-y}O_2$, where, $0.6<x<1$, $0<y<1$, and $0.6<x+y<1$.

The disclosure further provides a method of preparing a lithium-ion battery. The lithium-ion battery includes a cell and an electrolyte solution, and the cell includes a negative electrode sheet. The negative electrode sheet includes a negative electrode current collector, an active coating layer disposed on a surface of the negative electrode current collector, and a protective coating layer disposed on a surface of the active coating layer. The protective coating layer is a solid-state electrolyte coating layer. The electrolyte solution contains a film-forming agent. The method includes the following steps. After the cell is placed in a casing and the electrolyte solution is injected, formation is performed on the lithium-ion battery. The formation includes the following steps. In S1, charging is performed to 3.4V to 3.75V with a constant current rate of 0.02 C to 0.04 C. In S2, charging is performed to 3.75V to 4.25V with a constant current rate of 0.05 C to 0.3 C.

In the disclosure, a film-forming additive in the electrolyte solution is reduced into an SEI film in the formation process of step S1. A side of the SEI film close to the negative electrode active coating layer is an inorganic layer formed by a two-electron reaction, and an outer side of the SEI film is an organic layer formed by a single-electron reaction. In step S1, in order to ensure the integrity of the film formation, the current value is kept small, preferably 0.02 C to 0.04 C. Further, a reduction potential of the film-forming additive in the electrolyte solution is equal to or below 3.4V, so considering the polarization of the battery, a cut-off voltage range of constant current charging in step S1 is 3.4V to 3.75V. The formation process in step S2 is a process for reducing the electrolyte coating layer. The electrolyte is a solid-state inorganic substance. This process is a single reduction process of a solid-state inorganic substance. In this process, there is no need to use an excessively low current to ensure the integrity of a reduction product, and further, charging with a large current also saves time consumption in the battery preparation process. Since a reduction onset potential of the solid-state electrolyte is 3.75V, the cut-off voltage range of charging in step S2 is selected to be 3.75V to 4.25V. In step S2, through the reduction process, some high-valence metal elements in the solid-state electrolyte are reduced to low-valence metal elements.

In the disclosure, an SEI film with a sandwich structure is formed in situ on the surface of the negative electrode through a two-step formation process. The solid-state electrolyte film of this sandwich structure is arranged as: inorganic rigid ion conductor film—organic flexible ion conductor film—inorganic rigid ion conductor film. In this way, the mechanical strength, thermal stability, and electronic internal resistance of the SEI film on the negative electrode side are increased, and the safety of the negative electrode side is improved. Further, the crosstalk reaction between positive and negative electrodes can be suppressed, and the deposition of transition metal ions on the positive electrode side after dissolution at a negative electrode interface and the side reaction between the electrolyte solution and the negative electrode interface can be prevented from occurring, and the SEI film is thus prevented from being damaged.

The lithium-ion battery provided by the disclosure is formed by a two-step formation method. In the first step of the formation process, an electrolyte solution forms a solid-state ion conductor film (SEI film) on a surface of a negative electrode active coating layer. In the SEI film, the side close to the active coating layer is an inorganic rigid layer, and the side away from the active coating layer is an organic flexible layer. In the second step of the formation process, the solid-state electrolyte coating layer is reduced in situ to form a rigid inorganic solid-state ion conductor film, which gradually grows with the SEI film on the negative electrode side to form a protective layer with a sandwich structure of "rigid layer/flexible layer/rigid layer". In this way, the crosstalk reaction between the positive and negative electrodes can be suppressed, the transition metal ions leached from the high-nickel positive electrode is prevented from depositing on the surface of the negative electrode, the side reaction between the electrolyte solution and the negative electrode interface is hindered, the consumption of the electrolyte solution is reduced, and the cycle life is improved through the protective layer.

Specific examples are provided below to illustrate the disclosure in detail. Nevertheless, these examples are exemplary only and do not intend to limit the protection scope of the disclosure.

In the following Examples and Comparative Examples, the reagents, materials, and instruments used may all be commercially available unless otherwise specified.

Example 1

(1) Preparation of Negative Electrode Sheet

Negative electrode active material graphite or mixtures of graphite and other active materials in different mass ratios, conductive agent acetylene black, thickener CMC, and binder SBR were mixed in a mass ratio of 96.4:1:1.2:1.4, solvent deionized water was added, and the system was stirred under the action of a vacuum mixer until the system was uniform to obtain a negative electrode slurry. The negative electrode slurry was evenly coated on both surfaces of a negative electrode current collector copper foil, dried at room temperature, and transferred to an oven for further drying.

(2) Solid-State Electrolyte Coating Layer

The commercial NASICON-type oxide solid electrolyte $Li_{1.5}Al_{0.5}Ti_{0.5}(PO_4)_3$ (LATP) with a particle size D50=300 nm currently available on the market was adopted as the electrolyte, a slurry with a solid content of 30% was made according to a mass ratio of LATP:PVDF:NMP=3:1:6 by mixing at a high speed (the ratio is actually adjusted according to different solid content needs), evenly coated on the surface of the negative electrode with a coating thickness of 0.5 microns, and then dried.

(3) Preparation of Positive Electrode Sheet

A positive electrode active material NCM622, a conductive agent SP, and a binder PVDF were mixed at a mass ratio of 96:2:2, the solvent NMP was added, and the system was stirred under the action of a vacuum mixer until the system was uniform to obtain a positive electrode slurry. The positive electrode slurry was evenly coated on both surfaces of a positive electrode current collector aluminum foil, dried at room temperature, transferred to an oven for further drying, and then cold pressed and cut to obtain a positive electrode sheet.

(4) Preparation of Electrolyte Solution

Ethylene carbonate (EC), ethyl methyl carbonate (EMC), and diethyl carbonate (DEC) were mixed according to a volume ratio 1:1:1 to obtain an organic solvent. Next, the fully dried lithium salt $LiPF_6$ was dissolved in the abovementioned organic solvent, and an electrolyte solution with a concentration of 1 mol/L was prepared (the electrolyte composition is adjusted according to the actual situation).

(5) Preparation of Separator

A commercially available polyethylene PE film was selected as the separator.

(6) Preparation of Lithium-Ion Battery (6-1) Standing still: The abovementioned positive electrode sheet, the separator, and the negative electrode sheet were stacked in sequence so that the separator was located between the positive and negative electrode sheets for isolation, and then wound to obtain a bare cell. The bare cell was placed in an outer casing, and the electrolyte solution was injected after drying, and then the battery was vacuum-sealed and left to stand for 24 hours.

(6-2) First step of formation: After the battery was injected with the electrolyte solution and left to stand for 24 hours, it was charged to 3.75V with a constant current of 0.04 C using a LAND system. In this process, the film-forming additive in the electrolyte solution is reduced on the negative electrode side to form a solid-state ion conductor film (SEI film). An inner layer of the SEI film close to the negative electrode side is mainly an inorganic layer generated by a two-electron reaction, and an outer layer of the SEI film is mainly an organic layer generated by a single-electron reaction.

(6-3) Second step of formation: The battery was sealed to extract the gas in the battery after the first step of formation, and after the battery was sealed and left to stand for 24 hours, the battery was charged to 3.75V with a constant current of 0.3 C.

(6-4) Formation into a constant volume: The battery was sealed to extract the gas in the battery after the formation, after the battery was sealed and left to stand for 24 hours, the battery was charged to 4.25V with a constant current and constant voltage using the LAND system, the current was 0.33 C, the cut-off current was 0.05 C, and the battery was then discharged to 2.5V with a constant current of 0.33 C. After the formation into the constant volume, the battery was taken off from the charging device for use.

(7) Battery Testing (7-1) XPS testing: after the battery treated in the process (6) was disassembled in a glove box, the negative electrode sheet was cleaned with MDC, and then XPS testing was performed after drying. After the testing, software was used to fit the XPS data, and the element content ratio of $Ti^{4+}/Ti^{3+}$ was analyzed by an area ratio.

(7-2) Cycle testing: the battery processed in the process (6) was subjected to a normal temperature cycle test using a LAND system with a charging-discharging rate of 0.5 C/0.5 C and a cycle of 100 cycles. After the testing, the cycle data was processed to calculate a battery capacity retention rate after 100 cycles.

(7-3) ICP testing: after the battery cycled in process (7-2) was disassembled in the glove box, the negative electrode sheet was cleaned with MDC, dried, and then tested for ICP. After the testing, the ICP test data was analyzed and processed to obtain the dissolution content of three transition metal ions, Ni, Co, and Mn.

Example 2

(1) Preparation of Negative Electrode Sheet

The negative electrode sheet was prepared by the same method as in Example 1.

(2) Solid-State Electrolyte Coating Layer

The electrolyte was prepared by the same method as in Example 1, except that the coating thickness was 2 μm.

(3) Preparation of Positive Electrode Sheet

The positive electrode sheet was prepared by the same method as in Example 1.

(4) Preparation of Electrolyte Solution

The electrolyte solution was prepared by the same method as in Example 1.

(5) Preparation of Separator

The separator was prepared by the same method as in Example 1.

(6) Preparation of Lithium-Ion Battery

The lithium-ion battery was prepared by the same method as in Example 1, except that in the second step of formation (6-3), it was charged to 4.0V with a constant current of 0.1 C.

(7) Battery Testing

The testings were performed by the same method as in Example 1.

Example 3

(1) Preparation of Negative Electrode Sheet

The negative electrode sheet was prepared by the same method as in Example 1.

(2) Solid-State Electrolyte Coating Layer

The electrolyte was prepared by the same method as in Example 1, except that the coating thickness was 5 μm.

(3) Preparation of Positive Electrode Sheet

The positive electrode sheet was prepared by the same method as in Example 1.

(4) Preparation of Electrolyte Solution

The electrolyte solution was prepared by the same method as in Example 1.

(5) Preparation of Separator

The separator was prepared by the same method as in Example 1.

(6) Preparation of Lithium-Ion Battery

The lithium-ion battery was prepared by the same method as in Example 1, except that in the second step of formation (6-3), it was charged to 4.25V with a constant current of 0.05 C.

(7) Battery Testing

The testings were performed by the same method as in Example 1.

Example 4

(1) Preparation of Negative Electrode Sheet

The negative electrode sheet was prepared by the same method as in Example 1.

(2) Solid-State Electrolyte Coating Layer

The electrolyte was prepared by the same method as in Example 1, except that the coating thickness was 2 μm.

(3) Preparation of Positive Electrode Sheet

The positive electrode sheet was prepared by the same method as in Example 1.

(4) Preparation of Electrolyte Solution

The electrolyte solution was prepared by the same method as in Example 1.

(5) Preparation of Separator

The separator was prepared by the same method as in Example 1.

(6) Preparation of Lithium-Ion Battery

The lithium-ion battery was prepared by the same method as in Example 1, except that in the second step of formation (6-3), the constant current was 0.15 C.

(7) Battery Testing

The testings were performed by the same method as in Example 1.

Example 5

(1) Preparation of Negative Electrode Sheet

The negative electrode sheet was prepared by the same method as in Example 1.

(2) Solid-State Electrolyte Coating Layer

The electrolyte was prepared by the same method as in Example 1, except that the coating thickness was 2 μm.

(3) Preparation of Positive Electrode Sheet

The positive electrode sheet was prepared by the same method as in Example 1.

(4) Preparation of Electrolyte Solution

The electrolyte solution was prepared by the same method as in Example 1.

(5) Preparation of Separator

The separator was prepared by the same method as in Example 1.

(6) Preparation of Lithium-Ion Battery

The lithium-ion battery was prepared by the same method as in Example 1, except that in the second step of formation (6-3), it was charged to 4.25V with a constant current of 0.05 C.

(7) Battery Testing

The testings were performed by the same method as in Example 1.

Comparative Example 1

(1) Preparation of Negative Electrode Sheet

The negative electrode sheet was prepared by the same method as in Example 1.

(2) Solid-State Electrolyte Coating Layer:

No solid-state electrolyte coating layer was coated.

(3) Preparation of Positive Electrode Sheet

The positive electrode sheet was prepared by the same method as in Example 1.

(4) Preparation of Electrolyte Solution

The electrolyte solution was prepared by the same method as in Example 1.

(5) Preparation of Separator

The separator was prepared by the same method as in Example 1.

(6) Preparation of Lithium-Ion Battery

The lithium-ion battery was prepared by the same method as in Example 1, except that the formation step was (6-2) First step of formation: after the battery was injected with the electrolyte solution and left to stand for 24 hours, it was charged to 3.75V with a constant current of 0.04 C using a LAND system. Formation into a constant volume was performed after the formation step: the battery was sealed to extract the gas in the battery after the formation, after the battery was sealed and left to stand for 24 hours, the battery was charged to 4.25V with a constant current and constant voltage using the LAND system, the current was 0.33 C, the cut-off current was 0.05 C, and the battery was then discharged to 2.5V with a constant current of 0.33 C. After the formation into the constant volume, the battery was taken off from the charging device for use.

(7) Battery Testing

The testings were performed by the same method as in Example 1.

Comparative Example 2

(1) Preparation of Negative Electrode Sheet

The negative electrode sheet was prepared by the same method as in Example 1.

(2) Solid-State Electrolyte Coating Layer:

The electrolyte was prepared by the same method as in Example 1, except that the coating thickness was 10 μm.

(3) Preparation of Positive Electrode Sheet

The positive electrode sheet was prepared by the same method as in Example 1.

(4) Preparation of Electrolyte Solution

The electrolyte solution was prepared by the same method as in Example 1.

(5) Preparation of Separator

The separator was prepared by the same method as in Example 1.

(6) Preparation of Lithium-Ion Battery

The lithium-ion battery was prepared by the same method as in Example 1, except that in the second step of formation (6-3), the constant current was 0.5 C.

(7) Battery Testing

The testings were performed by the same method as in Example 1.

Comparative Example 3

(1) Preparation of Negative Electrode Sheet

The negative electrode sheet was prepared by the same method as in Example 1.

(2) Solid-State Electrolyte Coating Layer

The electrolyte was prepared by the same method as in Example 1, except that the coating thickness was 0.3 μm.

(3) Preparation of Positive Electrode Sheet

The positive electrode sheet was prepared by the same method as in Example 1.

(4) Preparation of Electrolyte Solution

The electrolyte solution was prepared by the same method as in Example 1.

(5) Preparation of Separator

The separator was prepared by the same method as in Example 1.

(6) Preparation of Lithium-Ion Battery

The lithium-ion battery was prepared by the same method as in Example 1, except that in the second step of formation (6-3), it was charged to 4.25V with a constant current of 0.05 C.

(7) Battery Testing

The testings were performed by the same method as in Example 1.

The parameters and test data of Examples 1 to 5 and Comparative Examples 1 to 3 are shown in Table 1.

TABLE 1

| | Thickness of protective coating layer | Types of solid-state electrolytes | $Ti^{4+}/Ti^{3+}$ element content ratio | Capacity retention rate after 100 cycles/% | Transition metal ion content/ppm | | |
|---|---|---|---|---|---|---|---|
| | | | | | Ni | Co | Mn |
| Example 1 | 0.5 μm | LATP | 1:0.1 | 91.3 | 87.6 | 53.4 | 50.8 |
| Example 2 | 2 μm | LATP | 1:0.5 | 96.3 | 25.6 | 16.3 | 14.5 |
| Example 3 | 5 μm | LATP | 1:1 | 92.7 | 67.4 | 46.1 | 41.3 |
| Example 4 | 2 μm | LATP | 1:0.3 | 90.7 | 96.3 | 55.6 | 52.3 |
| Example 5 | 2 μm | LATP | 1:0.7 | 93.8 | 63.2 | 44.5 | 40.7 |
| Comparative Example 1 | 2 μm | not coated | 0 | 88.5 | 166.4 | 65.3 | 60.1 |
| Comparative Example 2 | 10 μm | LATP | 1:0.02 | 88.1 | 123.4 | 56.2 | 53.6 |
| Comparative Example 3 | 0.3 μm | LATP | 1:2 | 89.6 | 68.7 | 38.7 | 35.4 |

It can be seen from the data in Table 1 that when the ratio of high-valence metal ions and low-valence metal ions in the electrolyte coating layer is within the range claimed by the disclosure, the capacity retention rate of the battery is higher. This is because the reduction process of the outermost electrolyte inorganic layer in the sandwich-structured SEI film is controlled by three parameters together: the reduction voltage, reduction current, and coating thickness. In Comparative Examples 2 to 3, a SEI film with a sandwich structure may also be formed, but the content ratio of high-valence metal elements to low-valence metal elements in the outermost inorganic electrolyte layer is not optimal. In this way, only the layer of particles in contact with the negative electrode active layer undergoes a reduction process. When this layer of particles reacts completely, it may grow together with the SEI film generated by the film-forming additive in the electrolyte solution, inhibiting the further reaction of the solid electrolyte coating layer. When the coating thickness is excessively high, the density of the electrolyte film is poor, and the crosstalk reaction between electrodes cannot be suppressed. When the coating thickness is excessively low, the density of the electrolyte film is higher, but the ion transport performance becomes worse and the electrical performance decreases.

In the disclosure, the SEI film grown by two-step formation has a three-layer structure, which is respectively inorganic-organic-inorganic from the inside to the outside of the SEI film. Compared to the commonly used one-step formation process, an extra inorganic layer is added to the outer layer, and in this way, the mechanical strength and thermal stability of the SEI film are increased. Moreover, the inorganic solid ion conductor film formed on the outermost layer has a dense structure, so the deposition of transition metal ions on the negative electrode interface can be suppressed during the cycle, and the cycle performance is thus improved.

The foregoing disclosed preferred embodiments of the disclosure are only used to illustrate the disclosure. The preferred embodiments do not describe all details of the disclosure, and the disclosure is not limited to the specific embodiments only. Obviously, according to the contents of the specification, many modifications and changes may be made. The embodiments selected and specifically described in the specification are used to better explain the principles and practical implementations of the disclosure, so that a person of ordinary skill in the art may fully understand and make use of the disclosure. The disclosure is only limited to the claims, the complete scope, and the equivalence.

What is claimed is:

1. A lithium-ion battery comprising a negative electrode sheet, wherein the negative electrode sheet comprises a negative electrode current collector, an active coating layer disposed on a surface of the negative electrode current collector, and a protective coating layer disposed on a surface of the active coating layer, the protective coating layer is a solid-state electrolyte coating layer, a solid-state electrolyte of the solid-state electrolyte coating layer is selected from one or more of $Li_{1+x}Al_xTi_{2-x}(PO_4)_3$, where $0<x<2$, and $Li_{3x}La_{2/3-x}TiO_3$, where $0<x<2/3$, and a molar ratio of a content of $Ti^{4+}$ to a content of $Ti^{3+}$ in the protective coating layer is 1:0.1 to 1:1.

2. The lithium-ion battery according to claim 1, wherein the molar ratio of the content of $Ti^{4+}$ to the content of $Ti^{3+}$ is 1:0.3 to 1:0.7.

3. The lithium-ion battery according to claim 1, wherein a thickness of the solid-state electrolyte coating layer is 0.5 µm to 5 µm.

4. The lithium-ion battery according to claim 1, wherein the active coating layer comprises an active material selected from one or more of graphite, silicon carbon, silicon oxide, and ferro-silicon alloy.

5. The lithium-ion battery according to claim 1, wherein a positive electrode active material of the lithium-ion battery is $LiNi_xCo_yMn_{1-x-y}O_2$, where, $0.6<x<1$, $0<y<1$, and $0.6<x+y<1$.

6. A method of preparing the lithium-ion battery according to claim 1, wherein the lithium-ion battery comprises a cell and an electrolyte solution, the cell comprises the negative electrode sheet, and the electrolyte solution contains a film-forming agent, wherein the method comprises: after placing the cell in a casing and injecting the electrolyte solution, performing formation on the lithium-ion battery, wherein the formation comprises:

S1, performing charging to 3.4V to 3.75V with a constant current rate of 0.02 C to 0.04 C; and S2, performing charging to 3.75V to 4.25V with a constant current rate of 0.05 C to 0.3 C.

7. A lithium-ion battery prepared by the method according to claim 6.

* * * * *